Figure 1:
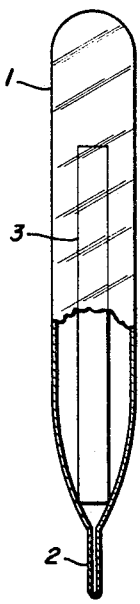

June 25, 1968  J. R. HRABINSKI  3,389,967

DETECTION OF TRACE AMOUNTS OF WATER

Filed Aug. 17, 1965

JOSEPH R. HRABINSKI, INVENTOR

BY Frank A. Seemore

ATTORNEY 3,389,967
DETECTION OF TRACE AMOUNTS OF WATER
Joseph R. Hrabinski, 1040 Woodbridge Ave.,
Fords, N.J. 08863
Continuation-in-part of application Ser. No. 274,812,
Apr. 22, 1963. This application Aug. 17, 1965, Ser.
No. 480,436
11 Claims. (Cl. 23—230)

The present invention relates to methods and apparatus for detecting extremely small trace, e.g. 10 p.p.m. amounts of total (free and combined) water present in organic or inorganic liquids which are inert to phosphorus pentoxide and to methyl orange indicator paper. More particularly, this invention relates to unique test paper comprising methyl orange indicator paper coated with a thin layer of finely divided particles of phosphorus pentoxide. Yet more particularly, in a preferred embodiment, this invention relates to testing the said organic or inorganic liquids for minute, e.g. 10 p.p.m. amounts of water by contacting a small test sample of the liquid with the said test paper. Most particularly, in a preferred embodiment, this invention relates to testing organic or inorganic liquids for both free and dissolved water by disposing a strip of the said indicator paper above a small test sample of the liquid in a closed container and observing any changes in color over a period of a few minutes. Also, in a preferred embodiment this invention relates to a device for detecting minute amounts of water in a liquid comprising a dry closed container containing (a) a gas inert to $P_2O_5$, methyl orange and to the liquid to be tested under a substantial partial vacuum and (b) a strip of methyl orange indicator paper coated with a thin layer of finely divided particles of phosphorus pentoxide held in an upper portion of the container, the said container having means in a lower portion of the container for providing an orifice through which liquid may be drawn under the influence of the partial vacuum to partially fill the container. This application is a continuation-in-part of Ser. No. 274,812 filed Apr. 22, 1963, now abandoned.

The present invention will be extremely useful in a number of applications where at present no simple rapid test device is available. As is well known, all of the devices presently available for detecting water in e.g. 10 p.p.m. quantities are complex, such as, for example, the Karl Fischer method and various other methods suggested in the literature which for various reasons have not become commercially available. The following fields of use indicate the scope and need for the present invention:

(1) Checking solvents for presence of water in laboratory and industrial applications, e.g. in metal alkyl catalyst polymerization reactions extremely low water level contents are required.

(2) Checking of gasoline, jet fuels, rocket fuels and solvents at tank cars, trucks and delivery sites, e.g. jet fuels may be checked for freedom from both free water and dissolved water.

According to the present invention it has now been discovered that trace amounts of both free and dissolved water can be detected simply by contacting the liquid with methyl orange indicator paper lightly coated with phosphorus pentoxide. In a preferred embodiment a critical feature of this invention is that an extremely thin layer (e.g. about one particle deep) obtained for example, by merely shaking or tumbling the paper in a container containing a small amount of $P_2O_5$ is used and the amount of liquid sample tested is small. Although the mechanism involved in the present invention is not fully understood it is thought that this procedure is essential due to the various hydration states obtained with $P_2O_5$. Thus, the extremely small amount of water present adds 1 mol of water per mol of $P_2O_5$ which immediately activates the indicator paper. Additionally, no additional particles of $P_2O_5$ either use up the available water or insulate the paper from the layer of particles next to the paper. It is, of course, not intended to limit this invention in any way by this explanation of the results obtained, the test paper and the process for using it being the invention taught.

In another preferred embodiment of the invention it has now been surprisingly found that rapid sensing of extremely small amounts of both free and dissolved water in organic liquids can be obtained by disposing at least a part of the paper above the surface of the liquid in a closed container. By this procedure very small amounts of water, e.g. levels of 10 parts per million can be sensed within short periods of time, e.g. 2 minutes. For positive detection of the same levels by other procedures such as mechanical shaking of the present paper immersed in the liquid, times of 15 to 30 minutes are required. This discovery opens the use of this invention for a number of applications which now can be satisfied only by Karl Fischer analysis.

Another important application of this invention is in testing of fuels and hydraulic oils for extreme altitude aircraft and rockets. At present several methods have been disclosed for checking jet fuels, etc. delivered to aircraft just prior to flight for free water. However, no methods have been suggested which will determine the presence also of dissolved water, particularly to the low levels described above. It is, therefore, considered that this invention is an important contribution to this field. At the temperatures prevailing in extreme altitudes any water including dissolved water present in the fuel presents a possibility of freezing to form ice crystals which may block lines, screens and orifices in the fuel system and other systems of the aircraft or rocket. Another important contribution of a preferred embodiment of the present invention is that the commercially used test procedures for detecting dispersed water are subject to inaccuracies due to the presence of various additives in the fuels. With the present preferred technique of disposing the indicator paper above the surface of the fuel or other liquid being tested so that the paper is only contacted by the vapors, not only are faster, more accurate readings obtained but also these additives (usually having a low vapor pressure) or the liquid being tested essentially does not effect the test results. It is noted that obviously both fuels in which appreciable quantities of water dissolve and fuels which dissolve only minute quantities of water may be tested for total water content.

In various preferred embodiments test papers may be supplied:

(A) In separate small sealed vials or containers into which the solvent sample may be introduced, e.g. by sealing the vials under a partial vacuum and breaking a fritted end off under the surface of the liquid so that an appropriate amount (determined by the degree of subatmospheric pressure) of the liquid is drawn into the vial.

(B) In a tightly stoppered bottle containing a number of test strips from which the individual strips may be transferred to the liquid sample to be tested in a dry box or under other suitable precautions to prevent contamination during transfer from moisture in the air.

(C) Coated with a protective coating impervious to water which will dissolve in the particular type of organic liquid to be tested, or which may be stripped or peeled off in the liquid to be tested.

(D) In stoppered bottles wherein the paper is disposed above the liquid with, if desired, part of the paper in contact with the liquid.

It has now been surprisingly discovered that a unique extremely sensitive rapid activating indicating paper can be prepared by lightly coating methyl orange paper with $P_2O_5$ powder. The present paper is unique in that other acid indicator papers tested, i.e. Congo red, Brilliant yellow, methyl orange, Blue litmus, pH (wide acid range) hydrion paper, all gave relatively poor results when similarly coated with $P_2O_5$. All of these papers tested including the preferred paper of this invention are porous papers impregnated with a solution of the active chemical and, of course, thoroughly dried, i.e. freed of moisture before coating with the phosphorus pentoxide.

Similarly, base indicator papers tested, e.g. Blue litmus or phenolphthalein papers coated with a mono particle layer of barium oxide were less sensitive than most $P_2O_5$ coated acid indicator papers and far less sensitive than the methyl orange paper of this invention.

The phosphorus pentoxide powder commercially available for laboratory use is suitable for the present invention. However, if desired, higher or lower purity powders may be used. These powders should preferably be of such fineness that they will all pass through a sieve having openings smaller than .125 mm.² and corresponding to which is usually referred to as "120 mesh to the inch" material.

It is noted that not only is the present paper extremely sensitive to water but it is also adapted to calibration to give reproducible results so that by correlating exposure time to various color changes precise measurement of the level of water present is possible.

Figure 2:
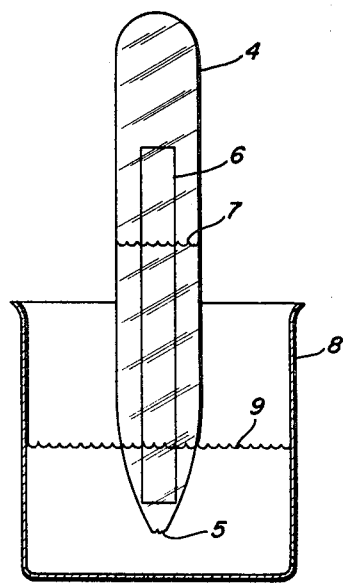
Figure 3:
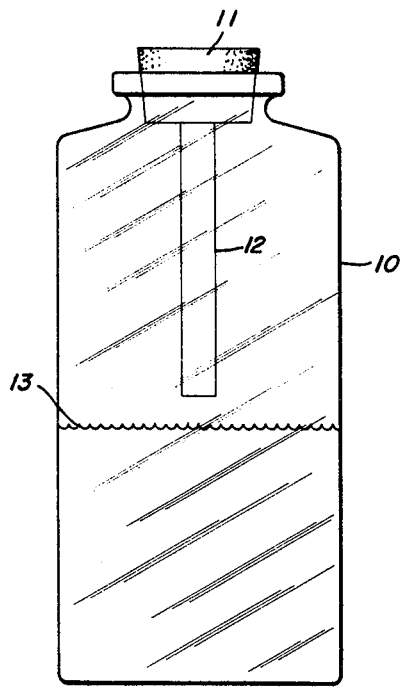
Figure 4:
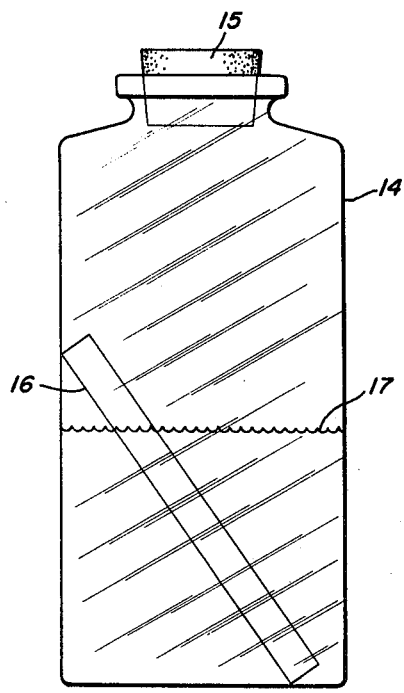

The present invention will be more clearly understood from a consideration of the accompanying drawings. FIGURE 1 presents a side view of a closed glass vial 1 having a sealed thin neck 2, the said vial containing a gas inert to $P_2O_5$, methyl orange and to the liquid to be tested, e.g. dry air or $N_2$, and containing a strip 3 of the methyl organe indicator paper coated with a thin layer of finely divided particles of $P_2O_5$. FIGURE 2 represents a side view of a vial 4 similar in all respects to the vial shown in FIGURE 1 except that the sealed tip of the thin neck 5 has been broken off thus opening the vial whereby the vial containing the paper 6 is partially filled with liquid 7 drawn under the influence of the partial vacuum, e.g. 7 p.s.i.a., from beaker 8 containing the said liquid 9 to be tested. It is noted that in a preferred embodiment the thin neck is of capillary tube size, e.g. 1/16" diameter so that the neck of the vial can be lifted out of contact with the liquid for easier viewing without liquid draining from the vial or appreciable moisture from the air entering the liquid to confuse the reading. Alternatively, a wider neck, e.g. 1/8" diameter, may be used without loss of liquid by draining as long as the vial is held vertical since the weight of the liquid will be supported by a reduction in pressure in the inert gas to the extent necessary. FIGURE 3 presents a side view of a test bottle 10 having a stopper 11, the test paper 12 affixed to the stopper or otherwise held in the dry vapor space and the liquid to be tested 13. In this embodiment the sample would be poured into the bottle in a dry box to protect the paper from moisture in the air. FIGURE 4 presents a side view of a test bottle 14 having a stopper 15 and a long loose strip of the test paper 16 extending above the liquid to be tested 17. It should be noted that in all the figures the vapor space above the liquid is intentionally small. If the space were large compared to the size of the liquid sample the small amount of water, e.g. 10 p.p.m., present would be too much diluted to give a good accurate reading. Typical preferred sizes are for the vial 2½" in overall length by ½" in diameter, for the bottles 50 or 100 ml.

The present invention will be more clearly understood from a consideration of the following examples fully illustrating this invention.

Example 1.—Preparation of paper and detection 10 p.p.m. water in hexane

To 500 ml. of dry solvent hexane in a 500 ml. ball joint glass graduate was added a strip of methyl orange test paper which had been coated with a layer of $P_2O_5$. The coating was accomplished by placing several strips of the test paper in a vial containing a small amount of finely divided $P_2O_5$ powder (laboratory grade) and shaking for about 1 minute. The contents of the graduate were shaken for 5 minutes, and it was noted that no change in color of the paper had occurred.

The stopper was removed and on it was placed a small drop of $H_2O$ (approximately .006 gm.). After replacing the stopper the hexane was shaken vigorously for 2 minutes. Very small but distinct orange spots were observed on the yellow paper, indicating that the water had been detected.

This example establishes that the sensitivity of the test is good for at least .001% (10 p.p.m.) $H_2O$ content (approximate since the actual drop used was not weighed; instead a drop of comparable size was weighed .006 gm./500 gm. solvent $\times 100\% = .0012\%$.) However, it should be noted that as compared to Example 2 this test is only an approximation to an actual test situation since the water was not fully dispersed prior to contacting with the paper.

Example 2.—Different papers at the 10 p.p.m. $H_2O$ level in hexane

Preparation of the test solvent.—To 1 liter of n-heptane (which had been dried previously over molecular sieves) was added 0.0100 g. of distilled water. The bottle was then shaken on a mechanical shaker for ~3 hours to disperse the water.

Preparation of the test papers.—Into each of 5 test bottles (4 oz. wide mouth bottles, predried in an oven @~120° C.) was placed 1 strip of $P_2O_5$ coated test papers as follows (coated as in Example 1):

Bottle: Test paper
1 _____ Methyl Orange.
2 _____ Brilliant Yellow.
3 _____ Congo Red.
4 _____ Blue Litmus.
5 _____ Methyl Violet.

Experimental procedure.—Into each of the 5 test bottles was placed ~50 ml. of the wet n-heptane (described above). The bottles were capped and taped and the following observations were made.

| | 1 | 2 | 3 | 4 | 5 |
|---|---|---|---|---|---|
| 11:45 a.m. | Added Solvent | Added Solvent | Added Solvent. | Added Solvent. | Added Solvent. |
| 12:00 p.m. | Trace of Red | N.R. | N.R. | N.R. | N.R. |
| 12:15 | Red spots incr. | N.R. | N.R. | N.R. | N.R. |
| 12:30 | Increasing | N.R. | N.R. | N.R. | N.R. |
| 12:45 | do | N.R. | N.R. | N.R. | N.R. |
| 1:00 | do | N.R. | N.R. | N.R. | N.R. |
| 1:15 | do | ~½ doz. min. black spots near edges. | N.R. | N.R. | N.R. |
| 1:45 | do | ~Same | N.R. | N.R. | N.R. |
| 2:30 | ~30% change | Sl. increase | N.R. | N.R. | N.R. |
| 3:15 | ~Same | ~Same | N.R. | N.R. | N.R. |
| 4:30 | ~Same | ~Same | N.R. | N.R. | N.R. |

Example 3.—Test of dry (commercial grade) solvent hexane 50 ml. samples of dry (commercial grade, without special drying prior to experiment) solvent hexane were placed in five 125 ml. ball joint erlenmeyer flasks with the following $P_2O_5$ coated test papers (coated as described in Example 1). The flasks were then allowed to stand for the time indicated

|  | #1 | #2 | #3 | #4 | #5 |
|---|---|---|---|---|---|
|  | Congo Red | Brilliant Yellow | Methyl Orange | Blue Litmus | pH Paper (Range 1-7) |
| 15 mins | N.R.[1] | N.R. | N.R. | N.R. | N.R. |
| 2 hrs | N.R. | N.R. | Tiny spots all over paper. | N.R. | N.R. |
| 60 hrs | Trace | N.R. | Same | Paper turned green at center. | N.R. |

[1] N.R.=No reaction.

This example indicates that this sample of commercial solvent hexane contained some water but much less than 10 p.p.m. Also, that this amount of water gives a completely negative (not ambiguous) reading for 2 hours.

Example 4.—Detection 20 p.p.m. water in benzene

To determine whether or not the paper can detect trace amounts of dissolved $H_2O$ in solvents two 50 ml. samples of dry $C_6H_6$ were taken from the same container. Samples #1 contained a strip of $P_2O_5$ coated methyl orange paper. (This is the control sample.)

Sample #2 contained only the dry $C_6H_6$. Into #2 was placed one microliter of, i.e. 20 p.p.m. $H_2O$. The sample was then shaken for 1 hour on a mechanical shaker. After shaking, a strip of the $H_2O$ detecting paper was placed in #2. Then both #1 and #2 were placed on the shaker for 4 hours.

After 4 hours no change occurred in #1 (control). After 2½ hours the paper in #2 began to show faint traces of red at the edges. After 4 hours sample #2 had sufficient red tinting at the edges of the paper so that the two samples could be distinguished readily.

After shaking overnight, no change was observed in #1 while #2 had increased considerably in red color.

Example 5.—The vapor phase effect—50 p.p.m. $H_2O$ in heptane

The heptane used in the following experiment was predried by percolating through a column of alumina and storing over Na ribbon.

From a 1 quart bottle of the dry heptane there was withdrawn 4 samples (∼50 ml. each) of the dry solvent. These four portions of dry heptane were then placed into test bottles each containing a methyl orange $P_2O_5$ coated strip of water detecting paper, prepared as in Example 1, and numbered as samples 1, 2, 3 and 4. The bottles were then sealed with melted wax.

After standing 24 hours, all four samples gave the same result. None showed even a trace of color change.

For the second series of samples, some wet heptane was prepared as follows. To 1000 ml. of dry heptane (referred to above) was added ∼.05 ml. of $H_2O$. The bottle was shaken vigorously for ∼5 minutes and then allowed to stand overnight. On the following morning the bottle was placed on rollers and agitated (rolled) for 2 hours (∼50 p.p.m. $H_2O$).

From this bottle of wet heptane were poured four 50 ml. samples of solvent which were placed into 4 oz. test bottles containing a strip of the $P_2O_5$ coated methyl orange water detecting paper and they were numbered as samples 1, 2, 3 and 4. The bottles were sealed with melted wax.

Within a few minutes the reddish color began to develop at the edges of the paper. The samples had been shaken gently by hand for about 2 minutes and then set aside. After about 5 minutes it was observed that in sample #4 where a portion of test paper had accidentally, due to shaking, ended up above the surface of the liquid, this portion of the paper had reacted to give a red color much more rapidly than the portion of paper below the surface of the liquid.

After observing this effect, the test paper in sample #2 was juggled around so that a portion of the paper extended above the surface of the liquid. Within 30 minutes the above liquid portion of the paper turned a distinct red while the rest of the paper showed only traces of red.

After standing for about 2 hours, not much change was observed except that the above liquid portions of samples 2 and 4 became a noticeably darker red.

Then sample #1 was arranged so as to allow a part of the paper to stick out above the liquid level. Within 30 minutes the above liquid part of the paper turned red.

Since relatively little color change had taken place in sample #3 for almost 4 hours, it was placed on the shaker for ½ hour without any significant change.

Sample #3 was then arranged in such a position that the entire strip of paper was above the liquid level. The sample was then allowed to remain in this position for 1 hour. No significant change in color was noted.

Sample #3 was then arranged so that only a portion of the paper protruded above the surface of the liquid. After 1 hour no change was observed and the sample was left overnight.

Also, the paper in #4 was inverted at 4:30 P.M. so that the red portion was at the bottom of the bottle and a yellow portion was now exposed above the surface of the liquid. The purpose of exposing a fresh yellow portion of the paper above the surface of the liquid is to see whether the color change has gone to completion.

The following morning:

(1) Sample #3 did not react at the exposed area (i.e. above liquid level) or the submerged area.

(2) Sample #4 did react at the exposed area but not at the submerged area.

(3) Sample #1 showed no signs of reacting further either at the exposed or submerged area. This seemed to indicate that with completely dry solvent samples no color change (either on the exposed or submerged area of the paper) takes place.

The question arising from the above data is "Why did sample #3 fail to react at the exposed area whereas sample #4 did react quite noticeably?" This may have been caused by the fact that sample #3 underwent a ½ hour period of vigorous shaking on the mechanical shaker. This shaking period may have caused all the water to react but in such a way that efficient contact of the reacted $P_2O_5$ with the paper was lost, i.e. the powder was shaken off. Additionally, the color change which was obtained was distributed over the entire paper, thus making it rather difficult to be observed when compared with a color change that is all localized in one place.

To check this point two additional samples of wet heptane prepared as above described were tested as follows. Sample #1 was allowed to stand with a portion of the paper exposed above the surface of the liquid. Within ½ hour the exposed portion of #1 became dark red.

Sampe #2 was shaken vigorously on a laboratory shaker for ½ hour. The sample was then allowed to stand with part of the paper exposed. The exposed part did turn red but at a much slower rate than #1. Hence, once the water in the sample is consumed or partially consumed, it appears that the color change on the exposed area will not occur or will occur at a much slower rate.

This increased color change may thus, in a preferred embodiment, decrease the amount of time necessary for detection of water, and increase the sensitivity of the paper.

Example 6.—Vapor phase effect using different papers @ a 10 p.p.m. H₂O level

Solvent: n-Heptane from same batch as used for experiment to observe the effect of different papers @ 10 p.p.m. H₂O level.

Test papers: Also from same batch as used for experiment to observe the effect of different papers @ the 10 p.p.m. H₂O level.

Procedure: A strip of each test paper was placed into separate 2/oz. wide mouth bottles (dried and purged with $N_2$). Then 50 ml. of the wet heptane (10 p.p.m. $H_2O$) was poured into each bottle. The bottles were then capped and shaken for 10 seconds and allowed to stand so that ~ a ¼″ portion of the test paper protruded above the surface of the liquid. The following results were observed.

| Time | 1 Methyl Orange | 2 Brilliant Yellow | 3 Congo Red | 4 Blue Litmus | 5 Methyl Violet |
|---|---|---|---|---|---|
| 12:00 | Added solvent and shook vigorously for 10 seconds | | | | |
| 12:02 | Upper area turning red. | N.R. | N.R. | N.R. | N.R. |
| 12:05 | Upper area red. | N.R. | N.R. | N.R. | N.R. |
| 12:10 | Upper area deep red. | N.R. | N.R. | N.R. | N.R. |
| 12:15 | Lower area traces of red. | N.R. | N.R. | N.R. | N.R. |
| 12:25 | ~same | U.A. light black; L.A., N.R. | N.R. | N.R. | N.R. |
| 12:30 | ~same | ~same | U.A. darkening | N.R. | N.R. |
| 12:40 | U.A. deep red; L.A. increasing. | U.A. Increasing; L.A., N.R. | U.A. increasing; L.A., N.R. | N.R. | N.R. |
| 1:00 | Same | Same | Same | N.R. | N.R. |
| 1:30 | Same | Same | Same | N.R. | N.R. |
| 2:00 | Same | Same | Same | N.R. | N.R. |
| 3:00 | Same | L.A., traces | Same | N.R. | N.R. |

N.R.=No reaction; U.A.=Upper area (above liquid level); L.A.=Lower area (in the liquid).

Example 7.—Vapor phase effect—50 p.p.m. H₂O in benzene

This experiment was conducted to confirm that the results reported in the preceding experiment are applicable also to benzene containing a small amount of water (i.e. benzene is known to absorb relatively large amounts of water compared to heptane).

Wet benzene containing 50 p.p.m. water was prepared as described in Example 5. Three samples of the wet benzene —50 ml. were tested with the water detecting paper. In sample #1, the test paper was kept below the liquid level, in sample #2, the test paper was partially exposed above the liquid level, and in sample #3, the test paper was wetted with the sample but was entirely suspended above the liquid level.

All samples began to undergo a color change within several minutes. Sample #2 reacted more rapidly at the part of the paper above the liquid level, but the effect was not as pronounced as the previous experiment using heptane. (By this is meant that the lower portion of the paper was turning red also but not as fast as the upper part. After standing for several hours all three samples turned red and it was no longer possible to distinguish the vapor state effect of sample #2.

Example 8.—Criticality of paper preparation procedure

To determine whether or not prepared H₂O detecting paper has any advantage as compared to:

(1) A test for water conducted by adding untreated indicator paper to a sample of solvent already containing $P_2O_5$.
(2) A test for water conducted by adding $P_2O_5$ to a sample of solvent already containing untreated indicator paper.

Sample identification for this experiment is as follows:

Sample #1—Dry benzene (100 ml.)
Sample #2—Consists of 500 ml. of $C_6H_6$ (dry) to which was added 25 microliters of $H_2O$, i.e. 50 p.p.m. The bottle was agitated on a roller for 1 hour to dissolve the $H_2O$.
Sample #3—Consists of a 100 ml. sample of the prepared wet $C_6H_6$ (#2). This sample was tested with prepared paper.
Sample #4—Consists of 100 ml. of prepared wet $C_6H_6$ (#2) to which was added a small quantity of $P_2O_5$.
Sample #5—Consists of 100 ml. of prepared wet $C_6H_6$ (#2) to which was added a strip of untreated methyl orange paper.

Procedure.—A 100 ml. sample of dry $C_6H_6$ (#1) was tested for $H_2O$ with a strip of treated paper. After 3 hours no presence of $H_2O$ was detected. Hence the supply of $C_6H_6$ was considered acceptable for the experiment.

A 500 ml. aliquot of $C_6H_6$ was drawn and to it was added 25 microliters 50 p.p.m. of $H_2O$ and the bottle was agitated on a roller for 1 hour to dissolve the $H_2O$. From this wet $C_6H_6$ was drawn three 100 ml. samples (#3, #4 and #5).

To sample #3 was added a strip of treated paper. To sample #4 was added some $P_2O_5$ and after 5 minutes of agitation a strip of untreated methyl orange paper was also added. To sample #5 was added a strip of untreated methyl orange paper and after 5 minutes of agitation a small amount of $P_2O_5$ was also added. Results are as follows. (Samples 3, 4 and 5 were placed on a mechanical shaker and observed.)

After 5 min.:
    #3—⅓ of paper turned red.
    #4—Traces of red at the edges.
    #5—Traces of red but more than #4.
After 20 min.:
    #3—½ of paper turned red.
    #4—Traces of red at the edges.
    #5—Freckled with tiny red spots.
After 30 min.:
    #3—All red except 2 small patches of yellow.
    #4—Traces of red at the edges.
    #5—Freckled with tiny red spots.
After 40 min.:
    #3—All red except 1 patch of yellow.
    #4—Traces of red at the edges.
    #5—Freckled with tiny red spots.
After 55 min.:
    #3—Completely red.
    #4—Traces of red at the edges.
    #5—Freckled with tiny red spots.
After 65 min.:
    #3—Completely red.
    #4—Traces of red at the edges.
    #5—Freckled with tiny red spots.

From these results it appears that treatment of the paper with $P_2O_5$ (coating operation) has a significant effect on the test. It is not likely that the different results were caused by a difference in the amounts [1] of $P_2O_5$ present in the sample because samples #4 and #5 had approximately the same amount of $P_2O_5$ present and yet they gave noticeably different results.

Example 9.—Criticality of paper preparation procedure—Amount of $P_2O_5$

A further comparison of results obtained by using coated paper with results obtained by using uncoated paper. This experiment is almost identical with that recorded in Example 4. Two points of difference are:

(1) Approximately double the amounts of $P_2O_5$ were used in the uncoated samples (as compared to those in Example 4).
(2) There was no 5 min. shaking period before the final addition of paper and $P_2O_5$ (respectively) to the uncoated samples.

Into 3 containers were placed 50 ml. of wet $C_6H_6$ (500 ml. of dry $C_6H_6$+25 microliters of HO). In sample #1 was placed a strip of coated paper. Into sample #2 was placed some $P_2O_5$ and then a strip of uncoated paper was added. Into sample #3 was placed a strip of uncoated paper and then some $P_2O_5$ was added. The amount of $P_2O_5$ added to each sample (i.e. #2 and #3) was ~double of that used in Example 4. A rough estimate of the amounts used for this experiment would be ~30 mg.

All 3 samples were then placed on a mechanical shaker for 1 hour and the following results were observed.

1½ min.:
   #1—Paper red at edges and ends.
   #2—No change in paper. $P_2O_5$ on the sides of the bottle.
   #3—No change in paper. $P_2O_5$ on the sides of the bottle.
4 min.:
   #1—Red colored area increases upwardly from edges.
   #2—No change.
   #3—No change.
10 min.:
   #1—Color change still increasing.
   #2—No change.
   #3—No change.
20 min.:
   #1—Paper almost completed changed to light red.
   #2—No change.
   #3—No change.
50 min.:
   #1—Paper almost completely dark red.
   #2—No change.
   #3—No change.
60 min.:
   #1—Paper was dark red except for a slightly yellow area.
   #2—No change.
   #3—No change.

From these results it appears that too much $P_2O_5$ is extremely deleterious to the results, i.e. the excess $P_2O_5$ reacted with the water and efficient contacting or reaction with the paper was somehow prevented.

Example 10.—Vapor phase effect with partially evacuated test bottle

Six test bottles containing $P_2O_5$ coated methyl orange paper were prepared under dry nitrogen atmosphere. Two of these bottles were used for this experiment. Sample No. 1 was the control and sample No. 2 was the partially evacuated test bottle. The experiment was conducted as follows:

The plastic cap of No. 2 was removed and replaced with a rubber stopper containing a glass tube and a length of tygon tubing approximately 12 inches long and stopped off with a pinched clamp. The tubing was attached to a vacuum line and the pinch clamp opened so that the test bottle was put under vacuum approximately 20 inches of mercury. Once the bottle was evacuated the plastic tubing was pinched off close to the glass tube in the stopper. Then the rest of the tubing was cut off so that a 3 inch length remained attached to the bottle. Approximately 200 ml. of wet heptane containing 10 p.p.m. of water was poured into a 400 ml. beaker. The tip of the tubing on No. 2 was submerged in the liquid and approximately 60 ml. of this solvent was drawn up into the test bottle. The tubing was then pinched off with the clamp and the sample set on the shelf so that the vapor phase effect could be observed. Into sample No. 1 was poured approximately 60 ml. of the wet heptane from the beaker and the bottle was capped off and placed on the shelf alongside sample No. 2.

11:55—Solvent was added to both test bottle.
12:10—Vapor phase effect was noticeable in both samples. The color change was approximately the same.
12:20—Red color becoming darker. Both samples reacting in the same manner.
12:25—Vapor phase portion of both samples dark red. Some freckling noticeable in the liquid portions of both samples.

Example 11.—Vapor phase effect—Effect of temperature

It was also found that temperature, i.e. 25° C. and 40° C. does not seem to be critical in calibrating the amount of water present by the vapor phase effect. Thus, calibration tables would not have to be adjusted for minor differences in temperature. However, it is not intended to limit this invention to operation at any particular temperature range. Thus, the effect of a wider variation in temperature on the vapor pressure of the water can be used to increase the sensitivity of the test if desired. However, this example also indicates the unique and surprising effect obtained with the present test paper.

Preferred liquids capable of being tested by the present invention technique preferably by the vapor phase effect are any organic or inorganic materials preferably liquid $C_1$–$C_{20}$ hydrocarbons, and substituted hydrocarbons, e.g. halogen substituted saturated hydrocarbons, olefins, diolefins, acetylenes, aromatics, alicyclic compounds, and halogen or other functional group substituted derivatives of these. It is noted that using the vapor phase technique even materials not inert to $P_2O_5$ can be tested particularly if these materials have a low vapor pressure so that the paper is not contaminated or deactivated and as mentioned above particularly if they have low solubility for water. Specific rocket fuels capable of being tested are e.g. hydrazine, decahydroacenaphthene, etc.

Example 12.—Paper coated with protective coating against $H_2O$

A protective coating for water detecting paper, for example, the paper could be butyl coated by dipping the active paper into a solution prepared from butyl polymer dissolved in heptane. Both the polymer and the solvent must be free of water. After dipping the paper would be placed in a vacuum oven in order to strip off the heptane.

The paper so treated might be much more resistant to atmospheric moisture and yet still retain its water detecting properties. The coating (protective) could be made of a variety of materials according to the solubility properties of the solvent being tested for water.

Preparation of butyl coated $H_2O$ detecting paper.—To make the coating solution 3 g. of high MW butyl polymer (uncured) was placed in 25 ml. of dry heptane. Both

---

[1] By a difference in the amounts of $P_2O_5$ present in the sample is meant the amount of $P_2O_5$ on the coated (#3) sample as opposed to the amounts in samples #4 and #5.

the butyl and the bottle were predried in an oven (air) for ½ hour. The $C_7$ addition was made in a dry box. The polymer and solvent were then shaken for 1 hour. Most of the polymer remained undissolved but enough did dissolve to give a viscosity of light oil.

The strip of paper was immersed into the coating solution twice and then placed in a heated vacuum oven to dry (20 in Hg).

Within 1 hour the paper had turned completely red and had to be discarded.

Two possible reasons for the color change are:

(1) Water present in the butyl itself.
(2) Exposure of the coated paper during the drying operation.

Preparation of butyl coated $H_2O$ detecting paper.—The coating solution (butyl-$C_7$) described above was shaken for ∼3 hours more to dissolve a larger quantity of the polymer. The viscosity increased and the solution became very cloudy.

A strip of the $H_2O$ detecting paper was dipped into this solution 3 times at 2 min. intervals. The paper was then placed in a heated vacuum oven (50° C. ∼30 in. Hg) to strip off the $C_7$.

After 45 min. in the vacuum, the sample was closed in a bottle and inspected. Some red spotting was observed at the center of paper strip and the point at which the forceps held the paper during the dipping. After 48 hours almost the entire sample had turned red although a little strip of slightly yellow color remained. This yellow strip was the portion of the paper that had the thickest coating of butyl. The uneven thickness was caused by formation of a bead of polymer due to excess coating material that ran down the paper during the drying process. Although some color change was observed, this sample is a big improvement over that previously prepared and indicates that the method is practicable. After 72 hours, the strip of paper had turned completely red.

What is claimed is:

1. The process for detecting minute amounts of water in a liquid which comprises contacting the said liquid with a test paper comprising methyl orange indicator paper coated with a thin layer of finely divided particles of phosphorus pentoxide for a sufficient period to obtain a color change when said liquid contains trace amounts of water.

2. The process of claim 1 in which the liquid is inert to phosphorus pentoxide and to methyl orange indicator paper.

3. The process of claim 1 in which the phosphorus pentoxide particles are smaller than 120 mesh and the coating is essentially of 1 particle thickness.

4. The process of claim 1 in which the liquid is a liquid $C_1$–$C_{20}$ hydrocarbon.

5. The process for detecting minute amounts of water in a liquid which comprises contacting a strip of methyl orange indicator paper coated with finely divided phosphorus pentoxide particles with vapors from the said liquid collected in a small confined space above the liquid to obtain a color change when said liquid contains trace amounts of water.

6. The process of claim 5 in which the liquid has low solubility for water.

7. The process of claim 5 in which the liquid has high solubility for water.

8. The process of claim 5 in which the liquid is a jet fuel.

9. The process of claim 5 in which the liquid is a $C_1$–$C_{20}$ liquid hydrocarbon.

10. A device for detecting minute amounts of water in a liquid comprising a dry closed container under a substantial partial vacuum of a gas inert to $P_2O_5$, methyl orange and to the liquid to be tested, containing a strip of methyl orange indicator paper coated with a thin layer of finely divided particles of $P_2O_5$ disposed and held in an upper portion of the container, the said container having means in a lower portion of the container for providing an orifice through which liquid may be drawn under the influence of the partial vacuum to partially fill the container.

11. A device for detecting minute amounts of water in a liquid comprising a dry partially evacuated closed container containing a strip of methyl orange indicator paper coated with a thin layer of finely divided particles of $P_2O_5$ disposed and held in the upper portion of the container and extending substantially into the lower portion of the container, the said container having frangible means for providing an orifice through which liquid may be drawn to partially fill the container.

References Cited

UNITED STATES PATENTS

| | | | |
|---|---|---|---|
| 2,214,354 | 10/1940 | Snelling | 116—114 |
| 2,249,867 | 7/1941 | Snelling | 73—335 |
| 2,487,077 | 11/1949 | Shepherd | 23—232 |
| 2,567,445 | 9/1951 | Parker | 23—230 |
| 2,844,025 | 7/1958 | Joyce et al. | 73—53 |
| 3,051,661 | 8/1962 | Collins | 252—408 |

OTHER REFERENCES

Pennington, W.: "Determination of Water in Freon 12," Analytical Chemistry, vol. 21, 1949, pages 766–9.

Cole et al.: "Continuous Coulometric Determination of Parts per Million of Moisture in Organic Liquids," Analytical Chemistry, vol. 31, 1959, pages 2048–50.

MORRIS O. WOLK, *Primary Examiner.*

Z. PAROCZAY, S. MARANTZ, *Assistant Examiners.*